United States Patent [19]
Oldack et al.

[11] 3,853,796
[45] Dec. 10, 1974

[54] HIGH STRESS-LOW ELONGATION RUBBER COMPOSITION

[75] Inventors: Richard C. Oldack, Jackson Township; Charles C. Raines, Canton; Richard L. Montgomery, Akron, all of Ohio

[73] Assignee: The Firestone Tire & Rubber Company, Akron, Ohio

[22] Filed: Sept. 7, 1972

[21] Appl. No.: 287,191

[52] U.S. Cl............ 260/5, 260/17 R, 260/17.4 BB, 260/17.4 CD, 260/38, 260/841, 260/857 G, 260/857 TW, 260/857 D, 260/859 R
[51] Int. Cl............................................. C08g 41/04
[58] Field of Search............ 260/5, 857 G, 857 D, 260/857 TW, 41.5 R, 17 R, 17.4 BB, 260/17.4 CD, 859 R

[56] References Cited
UNITED STATES PATENTS

| | | | |
|---|---|---|---|
| 3,261,885 | 7/1966 | Craubner et al. | 260/857 G |
| 3,337,648 | 8/1967 | Aelion et al. | 260/857 G |
| 3,431,227 | 3/1969 | Kastning et al. | 260/857 G |
| 3,481,923 | 12/1969 | Naarmann | 260/857 D |
| 3,738,948 | 6/1973 | Dunnom | 260/845 |
| 3,746,669 | 7/1973 | Dunnom et al. | 260/845 |

*Primary Examiner*—John C. Bleutge

[57] ABSTRACT

A high stress-low elongation polymeric composition is formed by a copolymer having a nylon constituent as well as a constituent made from conjugated dienes, a rubber polymer and fibers.

19 Claims, No Drawings

HIGH STRESS-LOW ELONGATION RUBBER COMPOSITION

BACKGROUND OF THE INVENTION

The present invention relates generally to a high stress-low strain modulus or low elongation polymeric composition. More specifically, the present invention relates to the incorporation of fibers, without any significant breakdown, into a mixture of a block copolymer containing a nylon constituent and a constituent derived from conjugated dienes and a rubber polymer to produce a polymeric composition which is able to withstand high stresses at very low strain values.

Heretofore, in the rubber polymer field, it has been essential to use conventional fillers, usually carbon black and sometimes silica, to improve the physical properties such as tensile strength of the pure gum vulcanizates. Although the fillers enhance such properties as the tensile strength, stiffness, abrasion and tear resistance, the rubber polymers still lack sufficient physical properties to allow their use as the only material in the production of V-belts, drive belts, conveyor belts, vehicle tire belts, hoses and the like.

In order to further improve the physical properties of rubber articles, it has been a common practice to strengthen and reinforce such articles with fabric filaments which are sometimes called cord. However, the incorporation of a fabric or textile into a rubber article necessitates additional processes such as the application of the rubber mixture to the textile, the improvement of the rubber to textile bonding and the production of the cured article in which the fabric filament reinforcement and the rubber act as an integral unit. These processes, of course, require costly, complex machines as well as expensive labor.

Another manner by which rubber polymers are reinforced is by the replacement of the textile or fabric filaments with staple fibers. Normally, these fibers are present in a random way and therefore do not exhibit the directionally reinforcing properties obtained with fabrics and filaments. As a result, staple fibers have largely been used mainly as fillers. A manner of obtaining directionally reinforced rubber materials by the incorporation of fibers is set forth in Canadian Patent No. 846,230. Nevertheless, the strength of such a material at a low elongation is still well below the strength of a fabric filament rubber material. Moreover, a rubber material made according to the Canadian patent has elongations much greater than fabric filament reinforced rubber.

SUMMARY OF THE INVENTION

It is, therefore, an object of the present invention to produce a composition having unexpected high stress values and very low strain values.

It is also an object of the present invention to produce a high stress-low strain composition, as above, which readily accepts fibers including fibers having a large L/D ratio.

It is another object of the present invention to produce a high stress-low strain composition, as above, in which the fibers are readily aligned with very little breakdown.

It is a further object of the present invention to produce a high stress-low strain composition, as above, which requires no adhesive system to bond the polymers to certain fibers and does not have to be reinforced with carbon black.

It is a still further object of the present invention to produce high stress-low strain composition, as above, which may be readily blended with various rubber compounds.

These and other objects of the present invention will be apparent in view of the following detailed description and are accomplished by means hereinafter described and claimed.

In general, a block copolymer having a nylon constituent as well as a constituent made from conjugated dienes may be blended with rubber polymers and incorporated with fibers which are very readily aligned to produce a polymeric composition which exhibits unexpectedly high stresses at very low strain values.

PREFERRED EMBODIMENTS OF THE INVENTION

A polymeric composition which generally exhibits properties characteristic of rubber compounds has an unexpected and an unusually high tensile strength as well as high stress at low elongations so that it can be used to make such items as V-belts, conveyor belts, tire plies and the like. Basically, the composition is generally made by blending together a rubber compound, fibers and a block copolymer having processing properties similar to rubber compounds and curing the composition in a manner utilized in curing typical rubber compounds.

Considering the block copolymer, it has a nylon constituent and a constituent generally made from conjugated dienes. The nylon portion of the block copolymer chain is made from the lactams or the internal amides having from three to sixteen total carbon atoms, for example, caprolactam or caprylactam. The conjugated dienes which may be used to form the remaining constituents contain from four to twelve carbon atoms and examples include 1,3-butadiene, isoprene, 2,3-dimethyl-1,3-butadiene; 2-methyl-1,3-pentadiene; 3,4-dimethyl-1,3-hexadiene; 4,5-diethyl-1,3-octadiene; 3-butyl-1,3-octadiene; phenyl-1,3-butadiene and the like. Furthermore, the diene compound butadiene may be combined with styrene to form a copolymer, namely styrene-butadiene which is also used as a diene derived constituent of the block copolymer. Thus, whenever the diene derived constituent is mentioned in this specification, it is to be understood that the styrene-butadiene copolymer is considered as being included in such a classification.

The procedure and manner enabling one skilled in the art to prepare the block copolymer is set forth in detail in a commonly owned U.S. Pat. application bearing U.S. Ser. No. 219,161, which was filed on Jan. 19, 1972.

This specification also teaches the various materials, requirements, conditions and the like to produce the block copolymer and is hereby incorporated by reference as part of the specification insofar as it relates to the block copolymer.

The weight range of the nylon constituent to the total weight of the copolymer as discolsed in the aforementioned specification may vary over a wide range. Generally, a desirable range of the nylon constituent for the present invention is from about 25 to about 90% since lower amounts tend to lack strength and higher amounts tend to make the incorporation of fiber difficult as well as cause fiber breakdown. A substantial amount of the copolymer thus consists of the diene derived compound so that heat stability is imparted to the copolymer. Furthermore, such a copolymer has been found to have good flexing resistance.

Considering now the rubber compound, it has been found that generally any conventional type of rubber may be blended with the block copolymer. Typical rubber compounds include natural rubber, polyisoprene (cis), butadiene, styrene-butadiene, duradene (a trademark of the Firestone Tire & Rubber Company for styrene-butadiene rubber made in a solution rather than in an emulsion), nitrile rubbers (various ratios of butadiene and acrylonitrile rubber), neoprene, butyl rubber, polyisobutylene and the like. Although the conventional rubber compounds and the block copolymers can be blended over a wide range, a desirable range which gives excellent physical properties such as high tensile strength and high stress at low strain values or at a low strain modulus when incorporated with fibers extends from very little and even no rubber compound content to about 55% by weight of rubber compound to the total weight of the rubber and block copolymer compounds.

Generally, the best aforementioned type of physical properties are obtained at the low end of the desired rubber compound range. Amounts of rubber above this desired range can also be used but such compositions when incorporated with fibers generally do not give the unexpected and unusually high aforementioned physical properties. Use of conventional rubber compounds has been found to aid in the processability of the composition and in the orientation of the fibers as well as in reducing the cost to produce the composition.

The fibers which can be used may be broadly classified as organic or inorganic and include any conventional type fabric. Generally, the fibers which are most commonly used include polyester, rayon, fiber glass, wood, cellulose, nylon and steel. Naturally, many other fibers not specifically enumerated can also be used. In order to bond the fibers to the other compounds, any conventional adhesive system such as HRH (hexamethylenetetramine, resorcinol, Hi-Sil) may be used in a manner as is well known to one skilled in the art. However, when the particular fiber is nylon flock, it has been found that good adhesion exists between the fiber and the block copolymer so that no adhesive agent or system is required.

The size of the fibers commonly given in terms of the length to the diameter, L/D, must generally be in excess of ten to one to impart any increase in strength to the compounds and may be as large as 100/1. Fibers having a large L/D are preferred and fibers having a L/D in excess of 100/1 are also favored since they impart excellent strength to the compounds. However, as a practical matter, fibers having a L/D in excess of 100/1 are often not used since they tend to physically break down or break apart during incorporation of the fibers into the compounds. Fibers having an actual length of ¼ and ½ inch have been found to give favorable results.

A range of fibers which has been found to give unexpected and outstanding properties extends from approximately fifteen parts to approximately 120 parts of fiber by weight per hundred parts of the blended rubber compound and block copolymer. As with the fiber ratio, even higher amounts of fiber are favored since it would give higher stress values but as a practical matter it often is hard to process or work with such a composition and it also is difficult to achieve good fiber orientation as well as to avoid fiber breakdown. A preferred range of fiber which avoids breakdown and achieves good orientation and thus gives very high stress values at a 5% elongation extends from approximately 25 parts to approximately 55 parts.

The incorporation of the fibers into the compounds may be carried out by any process or procedure which imparts alignment or orientation to the fibers as well known to those skilled in the art. For example, the fibers can be easily added to the compounds on a mill. They can also be added to the copolymer after polymerization while it is still in solution with the rubber compound being added later. Fiber orientation could then be achieved by calendering if desirable. The actual incorporation of the fibers within the above-noted ranges has been found to be easily achieved since either the block copolymer or the rubber compound is readily processable or millable, even at ambient temperatures, and therefore do not cause fiber breakdown. Processes or techniques which give greater alignment or orientation are thus preferred since such fiber compositions generally exhibit better physical properties such as strength. However, since most if not all fibers, are susceptible to breakage during orientation, it is therefore desirable to keep any orientation operation to a minimum.

Compositions made in accordance with the above description, as previously noted, have unexpected and unusually high stresses at low elongations as well as high tensile strengths. Generally, compositions of the present invention when cured in a conventional manner exhibit stresses in excess of 1000 p.s.i. at 5% elongation and generally in excess of 1500 p.s.i. and even 2000 p.s.i. It is noted that many of these values were obtained when the weight per cent of the rubber compound to the total weight of the compounds was approximately 50%. Compounds containing 50% of a rubber compound but without any fibers were generally found to have a low overall 5% elongation strength and the lowest tensile strength of various amounts of rubber compounds and copolymer blends. Hence, much of the data which is shown below probably represents the minimum values as far as tensile strength and high stress-low elongation values are concerned. The values obtained on the present composition compare dramatically with the various rubber compounds which when cured and reinforced with such fillers as carbon black only exhibited approximately a 50 p.s.i. stress value at a 5% elongation. The tensile strength of the compositions of the present invention also compare favorably to common rubber compounds. For example, reinforced vulcanizates such as styrene-butadiene and butyl rubber usually have a tensile strength of about 2,400 p.s.i. with elongations of about 500 and 800% respectively, and natural rubber has a strength of about 4000 p.s.i. at a 600% elongation. However, the tensile strength of the compositions set forth below generally range from 2500 p.s.i. to 6000 p.s.i. with elongations of 40% or less.

The exact reason for the unexpected and dramatic increase, especially the high stress values at low elongation is not known or understood but it is believed that rate of elongation of the compounds in the above ranges is very close or approximately the same as the elongation of the fibers. In any event, the composition can be used in applications where high stress and low elongation properties are desirable such as in V-belts, conveyor belts, driving belts, pipe gaskets, industrial and garden hoses, vehicle tire plies for tire belts and tire bodies and in other applications in lieu of continuous cord reinforced rubber.

The compositions according to the present invention can generally be cured according to any conventional manner well known to the rubber art. Thus, for example, any conventional aromatic oil in a normal amount can be used to aid in the processing of the composition, usually by causing the rubber to blend easier and by lowering the blending power requirements. Sulfur and accelerator curatives can also be used although it has been determined that generally a high sulfur-low accelerator cure system works best with the present compositions. Although carbon black is commonly used in conventional rubber as a reinforcing filler and pigment, the addition of carbon black to the copolymer compositions of the present invention does not result in any improved advantages or properties and thus may even be eliminated. As known to one skilled in the art, the elimination of carbon black or other conventional reinforcement from conventional rubber is unthinkable. When the composition is a blend of the copolymer and a rubber compound, the amount of carbon black will be proportional to the amount of rubber.

The invention will be more fully understood by referring to the following example which sets forth preparation of a nylon block copolymer and the following tables showing various physical properties of the composition made according to the present invention.

BLOCK COPOLYMER OF POLYCAPROLACTUM/1,4POLYBUTADIENE (73/27) PREPARED IN SUSPENSION

To a clean dry 28 oz. beverage bottle was added 500 cc of distilled mesitylene, 116 g of purified butadiene and 7.25 cc of a 1.64 molar ($1.19 \times 10)^{-2}$moles) butyl lithium in hexane solution. The bottle was stirred overnight at 25°C. on a magnetic stirrer before rapidly adding 9.30 cc of a 1.28 molar ($1.19 \times 10^{-2}$ moles) toluene diisocyanate solution. This solution was stirred for one hour before 315 g of molten distilled caprolactam and 11.6 cc of a 10% PBNA solution was added. This solution was pressure transferred to a 2 liter resin kettle that had been previously thoroughly dried and purged with nitrogen. The solution was heated to 160°C. with rapid stirring and held at this temperature for 16 hours. The solution became opaque at about 130°C., indicating the onset of polymerization of the caprolactam. The final mixture was a finely divided suspension pf 50% copolymer in mesitylene which showed almost no precipitation upon standing. The polymer was separated from the solvent by methanol precipitation to give a 25°C. millable copolymer with an intrinsic viscosity of 4.13.

Another block copolymer having an 80% nylon constituent and 20% butadiene constituent when blended with and without natural rubber according to the following recipe gave the physical test results shown in Table I.

TABLE I

| Stock No. | 1 | 2 |
|---|---|---|
| Ingredients | | |
| Nylon-Bd Block Copolymer (80/20) | 50 | 100 |
| Natural Rubber | 50 | — |
| Nylon Flock ¼" | 35 | 35 |
| ZnO | 2.5 | 2.5 |
| Stearic Acid | 2.0 | 2.0 |
| Hi-Sil (Precipitated Hydrated Silica Mfg. by PPG) | 5.0 | 5.0 |
| Resorcinol | 2.2 | — |
| Hexamethylene-Tetramine | 0.9 | — |
| Sulfur | 3.5 | 3.5 |
| Santocure NS | 1.4 | 1.4 |
| ML/4/212°F | 16 | 39 |
| Mooney Scorch at 265°F | | |
| $V_m$ | 6.2 | 2.7 |
| $T_1$ | 5.5 | 4.5 |
| $T_{10}$ | 7.5 | 5.5 |
| Instron Green Stress-Strain Test | | |
| Initial, lbs. | 30.7 | 11.0 |
| Peak, lbs. | 30.7 | 11.0 |
| Break, lbs. | 30.7 | 11.0 |
| %Elongation | 30.0 | 10.0 |
| Monsanto Rheometer Date at 300°F, Mini Die, 1°Arc, 100 RPM | | |
| Scorch Time, min. | 2.4 | 3.5 |
| Optimum Cure, min. | 8.7 | 18.6 |
| Min. Torque, in.-lbs. | 4.8 | 28.5 |
| Torque at 90% Cure, in.-lbs. | 72.5 | 116.2 |
| Max. Torque, in.-lbs. | 80.0 | 126.0 |
| Normal Stress-Strain — 300°F Cure | | |
| Tensile Strength, psi | | |
| 15' | 3825 | 6000 |
| 23' | 3600 | 5400 |
| 30' | 4200 | 4500 |
| Ultimate Elongation, % | | |
| 15' | 40 | 30 |
| 23' | 40 | 30 |
| 30' | 30 | 20 |
| Instron Low Strain Modulus — 23' at 300°F Cure | | |
| 5% Modulus, | 1400 | 2600 |
| Normal Hot Tensile — 23' at 300°F Cure | | |
| at 212°F | | |
| Tensile Strength, psi | 1930 | 1950 |
| % Elongation | 30 | 20 |
| at 275°F | | |
| Tensile Strength | 1930 | 1770 |
| Ultimate Elongation, % | 30 | 30 |
| Aged Stress-Strain — 4 Days at 212°F — 23' at 300°F Cure | | |
| Tensile Strength, psi | 4925 | 6152 |
| Ultimate Elongation, % | 30 | 30 |
| Steel Ball Rebound — 35' at 300°F Cure | | |
| at 73°F | 61 | 51 |
| at 212°F | 77 | 62 |
| Shore "A" Hardness — 35' at 300°F Cure | | |
| at 73°F | 79 | 93 |
| at 212°F | 81 | 93 |
| DeMattia Flex Test at 176°F — 35' at 300°F Cure | | |
| Cycles to First Crack | 36 | — |
| Cycles to Break | 60,725 | — |
| TEXUS Flex Tester at 73°F — 30' at 300°F | | |
| Cycles to First Crack | 12,000–16,000 | 437–1000 |
| Cycles to Break | 18,000–20,000 | 18,000–20,000 |

The same 80/20 block copolymer and natural rubber compound having the same recipe as stock No. 1 in Table I except for the substitution of different type of fibers for the nylon fibers was prepared and the test results are shown in Table II.

TABLE II

| Stock No. | | 3 | 4 | 5 | 6 |
|---|---|---|---|---|---|
| FEATURE | | | | | |
| Nylon-Bd Block Copolymer (80/20) | | 50 | 50 | 50 | 50 |
| Natural Rubber | | 50 | 50 | 50 | 50 |
| | | NBD/NR | NBD/NR | NBD/NR | NBD/NR |
| Nylon Flock | | — | — | — | 35 |
| Ground Wood | | 35 | — | — | — |
| Polyester Flock | | — | 35 | — | — |
| Rayon Flock | | — | — | 35 | — |
| Adhesive System HRH(Hexamethylene-Tetramine Resorcinol; Hi-Sil) | | HRH | HRH | HRH | None |
| MONSANTO RHEOMETER TEST at 300°F MINI DIE 1° ARC 100 RPM | | | | | |
| Scorch Time, Min. | | 3.8 | 4.0 | 3.0 | 5.8 |
| Opt. Cure, Min. | | 7.7 | 8.0 | 7.0 | 9.1 |
| Minimum Torque in-lbs | | 1.3 | 3.2 | 2.9 | 2.2 |
| Torque at 90% Cure in-lbs. | | 44.7 | 46.2 | 49.4 | 47.4 |
| Max. Torque in-lbs. | | 49.2 | 51.0 | 54.6 | 52.5 |
| NORMAL STRESS-STRAIN 300°F CURE | | | | | |
| 5% Modulus, psi | 15 | 1000 | 1300 | 1240 | 1000 |
| | 30 | 1000 | 1300 | 1240 | 1000 |
| Tensile Strength, psi | 15 | 2450 | 3240 | 2480 | 1480 |
| | 30 | 2500 | 3500 | 2480 | 1600 |
| Ultimate Elongation, % | 15 | 15 | 15 | 10 | <10 |
| | 30 | 15 | 15 | 10 | <10 |
| SHORE "A" HARDNESS 35'/300°F CURE | | | | | |
| % at 73°F | 81.0 | | 84.0 | 84.5 | 74.5 |
| STEEL BALL REBOUND 35'/300°F | | | | | |
| % at 73°F | | 44 | 52 | 47 | 45 |
| % at 212°F | | 56 | 68 | 60 | 67 |

Table III shows the test results of a block copolymer having 73% nylon and 27% butadiene prepared according to the recipe set forth in the table wherein no rubber polymer was used.

TABLE III

| | R172022 | −020 | −919 | −023 |
|---|---|---|---|---|
| Nylon Butadiene Copolymer (73/27) | 100.0 | 100.0 | 100.0 | 100.3 |
| Zinc Oxide | 2.5 | 2.5 | 5.0 | 2.5 |
| Stearic Acid | 2.0 | 2.0 | 2.0 | 2.0 |
| Sulfur | 1.7 | 1.7 | 2.0 | 1.7 |
| Santocure NS | 1.2 | 1.2 | 1.2 | 1.2 |
| DiCup 40 | — | — | 7.5 | — |
| ¼" Nylon Flock | 20.0 | 35.0 | 45.6 | 102.0 |
| | 127.4 | 142.4 | 163.3 | 214.8 |
| Volume % Flock | 15.7 | 24.6 | 27.9 | 47.5 |
| Stress-Strain Properties — Cured 20' at 300°F | | | | |
| 5% Modulus, psi | 1150 | 1850 to 2050 | 1500 to 2000 | 1300 |
| Tensile Strength, psi | 4150 | 6550 | — | 3750 |
| Ultimate Elongation, % | 39 | 32 | — | 19 |
| Cyclic Low Strain Modulus — Cured 20' at 300°F, Tested at 5 ipm | | | | |
| 0-10% Elongation | | | | |
| 5% Modulus 1st cycle | 825 | psi 1620 | psi | — — |
| do. 2nd do. | 750 | do. 1475 | do. | — — |
| do. 15th do. | 750 | do. 1350 | do. | — — |
| % Recovery in 4 sec. | 87.5 | 90 | | |
| 0-20% Elongation | | | | |
| 5% Modulus 1st cycle | 825 | psi 1575 | psi | — — |
| do. 2nd do. | 575 | do. 1075 | do. | — — |
| do. 20th do. | 575 | do. 975 | do. | — — |
| % Recovery in 8 sec. | 82.5 | 80 | | |

It can be seen that the disclosed invention carries out the objects of the invention set forth above. As will be apparent to those skilled in the art, many modifications can be made without departing from the spirit of the invention herein disclosed and claimed, the scope of the invention being limited solely by the scope of the attached claims.

We claim:

1. A high stress-low elongation polymeric composition, comprising; a block copolymer having a nylon polymer constituent blocked to at least one end capped polymer constituent to form the block copolymer, said end capped polymer constituent containing a base polymer constituent connected to a single compound selected from the group consisting of a polyisocyanate and a polyisothiocyanate through one of the isocyanate groups or the isothiocyanate groups, said base polymer made by the anionic polymerization of conjugated diene monomers, said nylon polymer constituent connected to said end capped polymer through another isocyanate group of said polyisocyanate or another isothiocyanate group of said polyisothiocyanate and produced by the anionic polymerizations of lactams, said weight range of said nylon polymer constituent to said block copolymer ranging from about 25 to about 90% and including from about 15 to about 120% by weight based on the block copolymer of short nylon fibers so as to produce a polymeric composition having a high stress at a very low elongation.

2. A high stress-low elongation polymeric composition as set forth in claim 1, wherein the polymeric composition has a high stress at a 5% elongation.

3. A high stress-low elongation polymeric composition as set forth in claim 2, wherein said high stress is at least 1,000 P.S.I.

4. A high stress-low strain polymeric composition as set forth in claim 1, wherein a rubber compound is added to the composition, said rubber compound ranging from a nil amount to about 55% by weight based on the block copolymer.

5. A high stress-low strain polymeric composition, as set forth in claim 1, wherein said nylon constituent is made from lactams having from 3 to 16 total carbon atoms.

6. A high stress-low strain polymeric composition, as set forth in claim 5, wherein said lactams are selected from the group consisting of caprolactam and caprylactam.

7. A high stress-low strain polymeric composition as set forth in claim 1, wherein said base polymer is conjugated dienes having from 4 to 12 carbon atoms.

8. A high stress-low strain polymeric composition, as set forth in claim 1, wherein said conjugated dienes are selected from the group consisting of isoprene and 1,3 butadiene.

9. A high stress-low strain polymeric composition, as set forth in claim 1, wherein said diene constituent is the copolymer styrene-butadiene.

10. A high stress-low strain polymeric composition, as set forth in claim 4, wherein said rubber compound is selected from the group consisting of natural rubber, polyisoprene, polybutadiene, copolymers of styrenebutadiene, copolymers of acrylonitrilebutadiene, polychloroprene, butyl rubber and polyisobutylene.

11. A high stress-low strain polymeric composition, as set forth in claim 4, wherein said rubber compound is selected from the class consisting of natural rubber, polybutadiene, copolymers of styrene-butadiene, and polyisoprene.

12. A high stress-low strain polymeric composition, as set forth in claim 1, wherein said fibers have a L/D of from 10/1 to about 100/1.

13. A high stress-low strain polymeric composition, as set forth in claim 1, wherein said range by weight of said fibers is from about 25 parts to about 55 parts.

14. A process for making a high stress-low strain polymeric composition comprising the steps of preparing a block copolymer having a nylon polymer constituent blocked to at least one end capped base polymer constituent comprising the steps of anionically polymerizing conjugated diene monomers, in the presence of an organo alkali metal initiator to form alkali metal terminated base polymers rapidly adding a sufficient amount of a compound selected from the group consisting of a polyisocyanate and a polyisothiocyanate to said base polymer so that at least 5% of said base polymers are end capped by a single polyisocyanate or a polyisothiocyanate through one of the isocyanate groups of the isothiocyanate groups, maintaining said end capped base polymer constituent in an environment substantially free from compounds containing active hydrogens and reacting said end capped base polymer through another isocyanate group or isothiocyanate group with lactams having from 3 to 10 total carbon atoms to form the nylon polymer constituent, said weight of said nylon polymer constituent to said block copolymer ranging from about 25 to about 90% and incorporating from about 15 to about 120% by weight based on the block copolymer short nylon fibers to produce a polymeric composition having a high stress at a very low elongation.

15. A process as set forth in claim 14, wherein said orientation is carried out at ambient temperatures.

16. A process for making a high stress-low strain polymeric composition as in claim 14 including the additional step of orientating said fibers.

17. A process for making a high stress-low strain polymeric composition as in claim 14 wherein said base polymer is conjugated dienes having from 4 to 12 carbon atoms.

18. A process for making a high stress-low strain polymeric composition as in claim 14 including the additional step of adding a rubber compound ranging from a nil amount to about 55% by weight based on the block copolymer.

19. A process for making a high stress-low strain polymeric composition as in claim 18 wherein said rubber compound is selected from the group consisting of natural rubber, polyisoprene, polybutadiene, copolymers of styrenebutadiene, copolymers of acrylonitrile-butadiene, polychloroprene, butyl rubber and polyisobutylene.

* * * * *